(12) United States Patent
Parrish et al.

(10) Patent No.: US 8,409,534 B2
(45) Date of Patent: Apr. 2, 2013

(54) CONTROL OF EMISSIONS

(75) Inventors: Clyde F. Parrish, Trinity, FL (US); Landy Chung, Jacksonville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 851 days.

(21) Appl. No.: 11/692,557

(22) Filed: Mar. 28, 2007

(65) Prior Publication Data
US 2008/0241030 A1   Oct. 2, 2008

(51) Int. Cl.
*B01D 47/00* (2006.01)
*B01D 53/56* (2006.01)

(52) U.S. Cl. ............ 423/210; 423/235; 423/242.1

(58) Field of Classification Search .......... 423/210, 423/235, 242.1, 243.01, 243.02, 243.11, 423/393, 394, 215.5, 579, 539, 477, 478
See application file for complete search history.

(56) References Cited

U.S. PATENT DOCUMENTS

| | | | |
|---|---|---|---|
| 3,322,497 A * | 5/1967 | Martin | 423/479 |
| 3,760,061 A * | 9/1973 | Hammond | 423/243.01 |
| 3,991,167 A | 11/1976 | Depommier et al. | |
| 4,035,470 A | 7/1977 | Senjo et al. | |
| 4,110,183 A | 8/1978 | Furuta et al. | |
| 4,119,538 A | 10/1978 | Yamauchi | |
| 4,181,507 A * | 1/1980 | Nolden | 95/186 |
| 4,341,747 A | 7/1982 | Downey | |
| 4,514,366 A | 4/1985 | Barber | |
| 5,064,625 A | 11/1991 | Curtius | |
| 5,192,355 A | 3/1993 | Eastin | |
| 5,275,639 A | 1/1994 | Sullivan | |
| 5,328,673 A | 7/1994 | Kaczur et al. | |
| 5,345,033 A | 9/1994 | McLaughlin | |
| 5,362,319 A | 11/1994 | Johnson | |
| 5,397,549 A * | 3/1995 | Newman | 423/235 |
| 5,447,637 A | 9/1995 | Barber | |
| 5,514,352 A | 5/1996 | Hanna et al. | |
| 5,637,282 A | 6/1997 | Osborne et al. | |
| 5,639,434 A | 6/1997 | Patrikainen et al. | |
| 5,900,042 A | 5/1999 | Mendelsohn et al. | |
| 6,039,783 A * | 3/2000 | Lueck et al. | 71/59 |
| 6,146,604 A | 11/2000 | Kiiskila et al. | |
| 6,447,740 B1 | 9/2002 | Caldwell et al. | |
| 7,118,720 B1 | 10/2006 | Mendelsohn et al. | |

(Continued)

FOREIGN PATENT DOCUMENTS

| | | |
|---|---|---|
| DE | EP 0 177 839 A2 | 9/1985 |
| EP | 0487834 A1 | 6/1992 |
| WO | WO 94/12429 A1 | 6/1994 |
| WO | WO 03/103810 A1 | 12/2003 |

OTHER PUBLICATIONS

Eckenfelder et al., Chemical Oxidation: Technologies for the Nineties, 1995, Technomic Publishing, p. 171.*

(Continued)

*Primary Examiner* — Melvin C Mayes
*Assistant Examiner* — Sheng H Davis
(74) *Attorney, Agent, or Firm* — Randall M. Heald; Jennifer P. Yancy

(57) ABSTRACT

Methods and apparatus utilizing chlorine dioxide and hydrogen peroxide are useful to reduce emissions of NOx, SOx, and heavy metals, e.g., mercury, emissions from combustion flue gas streams.

27 Claims, 3 Drawing Sheets

U.S. PATENT DOCUMENTS

| | | |
|---|---|---|
| 7,404,938 B2 | 7/2008 | Parrish |
| 2004/0175322 A1 * | 9/2004 | Woodruff et al. ............. 423/478 |
| 2005/0008554 A1 | 1/2005 | Nowosielski-Slepowron et al. |
| 2005/0214187 A1 | 9/2005 | Johnson |
| 2006/0239877 A1 | 10/2006 | Johnson et al. |
| 2007/0237708 A1 * | 10/2007 | Woodruff et al. ............. 423/478 |
| 2008/0213148 A1 | 9/2008 | Parrish et al. |

OTHER PUBLICATIONS

Clyde Parrish and Landy Chung, Phoenix-NASA Low Temperature Multi-Pollutant (NOx, SOx, & Mercury) Control System for Fossil Fuel Combustion, Nov. 28-30, 2006, pp. 1-12.

* cited by examiner

CONTROL OF EMISSIONS

ORIGIN OF THE INVENTION

The invention described herein was made in part by an employee of the United States Government and may be manufactured and used by and for the Government of the United States for governmental purposes without the payment of any royalties thereon or therefor.

TECHNICAL FIELD OF THE INVENTION

The present invention relates generally to emission control and in particular to the control of emissions from combustion sources.

BACKGROUND OF THE INVENTION

Control of emissions from fossil fuel combustions sources addresses a major environmental problem. The Environmental Protection Agency (EPA) through the Clean Air Act regulates the emissions from fossil-fuel-fired power plants. Initial regulations were focused on oxides-of-nitrogen (NOx) and oxides-of-sulfur (SOx) emissions, but newer regulations will include provisions to control heavy metals (Hg, etc.) and carbon dioxide. In particular, elemental mercury emissions from coal-fired power plants are a major concern.

Processes are known to remove particulate and oxidized mercury from waste streams. Particulate matter traps some oxidized and elemental mercury and these forms of mercury associated with this particulate matter are removed when the particulate matter is removed. For example, electrostatic precipitators or fabric filters can be used to remove particulate matter from flue gas. Oxidized mercury has varying solubility and can be captured in wet or dry scrubbers, but the results from flue gas desulfurization units are inconsistent. Elemental mercury in flue gas presents a particular challenge in that it is not soluble and must be oxidized before it can be captured in a scrubber system.

For the reasons stated above, and for other reasons stated below that will become apparent to those skilled in the art upon reading and understanding the present specification, there is a need in the art for alternative methods and apparatus for treating combustion gas streams.

SUMMARY OF THE INVENTION

Methods and apparatus utilizing gaseous chlorine dioxide ($ClO_2$) to reduce mercury emissions are described herein. Such methods and apparatus may be stand-alone systems or may further be incorporated into more encompassing systems, such as systems utilizing hydrogen peroxide to reduce SOx, NOx, and/or other emissions. The apparatus is modular and components can be added or removed depending upon the specific requirements for a given removal operation.

For one embodiment, the invention provides a method of treating a gas stream for removal of at least elemental heavy metal, such as mercury, from the gas phase. The method includes washing the gas stream with water, scrubbing the gas stream with an acidic hydrogen peroxide solution, oxidizing the gas stream with gaseous chlorine dioxide, and scrubbing the oxidized gas stream with an acidic hydrogen peroxide solution to remove $NO_2$ and heavy metal compounds.

For a further embodiment, the invention provides a system for the removal of at least elemental mercury from a gas stream. The system includes a heat exchanger and a water cooler unit to receive the gas stream, a first scrubber coupled to receive the gas stream from the water cooler unit and a first scrubber liquor, an oxidation tower coupled to receive the gas stream from the first scrubber and gaseous chlorine dioxide, and a second scrubber coupled to receive the gas stream from the oxidation tower and a second scrubber liquor.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof.

Emission control systems in accordance with the invention address environmental pollutants SOx, NOx, and mercury or other heavy metals. Such systems are designed to control emissions of these environmental pollutants to the levels established by the Environmental Production Agency (EPA). This emission control system provides a method based on the use of gaseous chlorine dioxide to reduce elemental metal emissions, and hydrogen peroxide to reduce the SOx, NOx, and metal oxide emissions, from combustion sources to acceptable levels as established by the EPA. In addition, useful by-product streams of sulfuric acid, nitric acid, salts of these acids, and feedstock for oxides-of-metal production may be isolated.

Figure 1A:
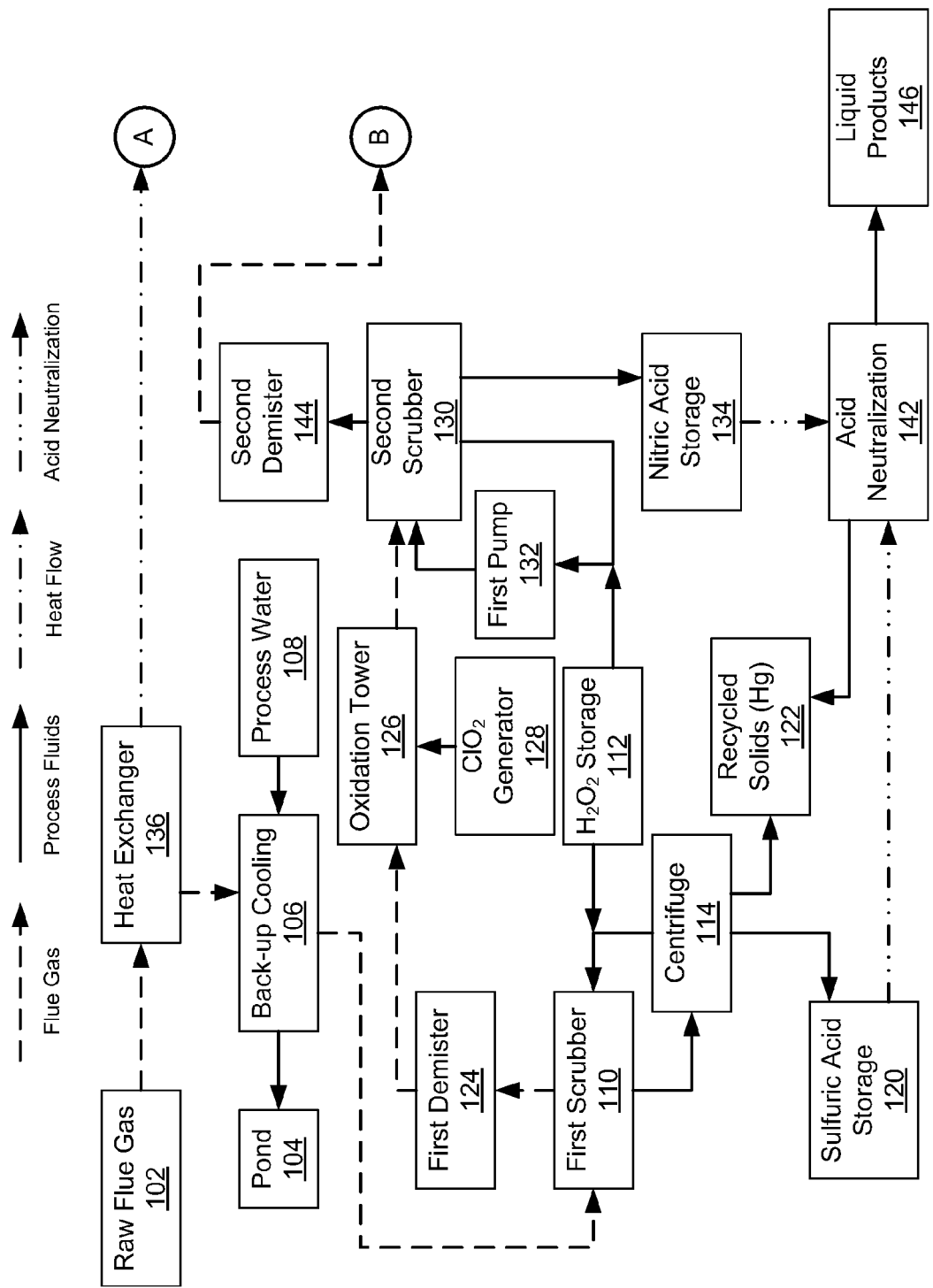
FIGS. 1A and 1B are block schematic drawings of an emission control system in accordance with an embodiment of the invention.
Figure 1B:
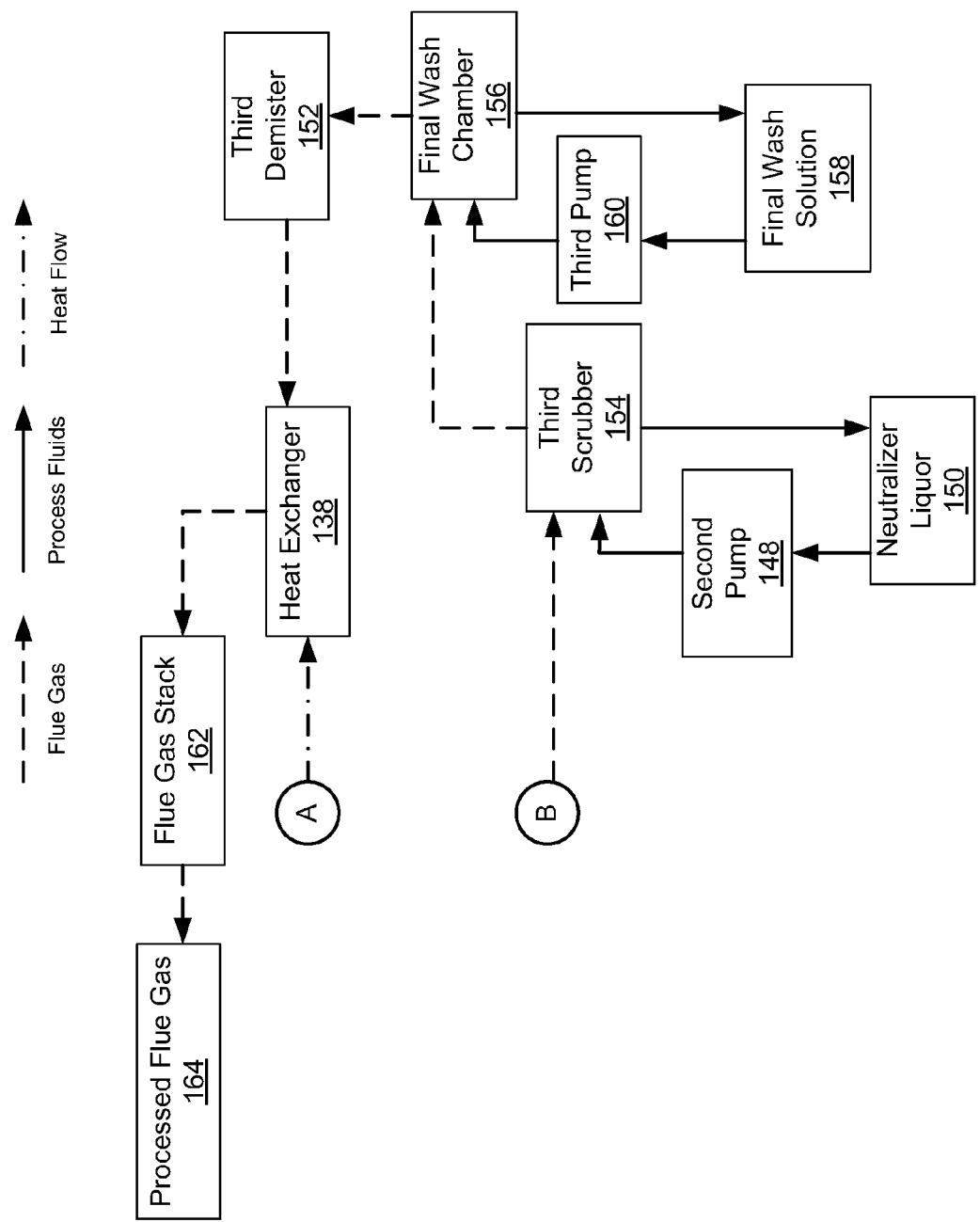

FIGS. 1A and 1B are block schematic drawings of an emission control system in accordance with an embodiment of the invention. FIGS. 1A and 1B represent two portions of the emission control system, with the connectivity of the figures occurring at reference letters A and B. The process starts with a gas stream, such as raw flue gas 102 after the particulates have been removed. There are several options for this design and steps can be omitted or alternate unit operations may be substituted for the general processes depending on the requirements of the installation. These alternate steps are noted during the description of the process.

The first step of the process is to use a heat exchanger 136 to cool the entering flue gas 102. The flue gas 102 may also be cooled and washed, when needed, using process water 108 in backup cooling chamber 106. Heat exchanger 136 is coupled with heat exchanger 138 (at reference letter A) to raise the temperature of the exiting processed flue gas 164. Process water 108 from chamber 106 with particulates and heat are sent to the sedimentation and cooling pond 104.

The cooled and washed flue gas is fed from chamber 106 to a first scrubber tower 110 for the removal of SOx. A portion of any heavy metal content, in the form of oxides or hydroxides of metal, may also be removed in the first scrubber tower 110. First scrubber tower 110 may use hydrogen peroxide from hydrogen peroxide storage 112 to oxidize sulfurous acid ($H_2SO_3$) to sulfuric acid ($H_2SO_4$) to prevent reemission of $SO_2$. Hydrogen peroxide storage 112 preferably provides aqueous hydrogen peroxide of approximately 35% to 70% by volume, and more preferably at approximately 70% by volume. As the scrubber liquor pH decreases due to the formation of sulfuric acid, most of the heavy metal oxides, including Hg, etc., are dispersed as metal oxides and/or dissolved hydroxides are converted to sulfates. The remaining un-dissolved particulates and insoluble sulfates are removed with a solids removal system 114, e.g., a solid-bowl centrifuge, a continuous belt filter or other system for the continuous removal of solids from a liquid stream. FIG. 1A depicts the use of a centrifuge 114 as the solids removal system as but one example.

Centrifuge 114 continuously removes the solids and circulates the scrubber liquor back to first scrubber tower 110 for continuous scrubbing and cleaning of the flue gas. When the scrubber liquor (sulfuric acid) reaches the desired concentration, the cleaned scrubber liquor is discharged from the centrifuge 114 to sulfuric acid storage 120, which can then be utilized for fertilizer, industrial uses, or neutralized and discarded. The solids from centrifuge 114 are discharged to the recycle solids container 122. Soluble metals and metal oxides present in the cleaned scrubber liquor may further be removed as insoluble solids upon neutralization of the sulfuric acid as may be performed in container 142, for example, during the production of fertilizer. The liquid fertilizer or neutralized liquid products are stored in container 146.

The concentration of hydrogen peroxide in the first scrubbing mixture is maintained at a predetermined level, e.g., 0.1 to 5 percent by volume. Concentration of the first scrubbing mixture may be maintained using a hydrogen peroxide controller of the type described in U.S. Pat. No. 6,039,783 issued Mar. 21, 2000, to Lueck et al. and U.S. Pat. No. 6,641,638 issued Nov. 4, 2003, to Lueck et al.

When the flue gas exits the first scrubber 110, it may contact a demister 124, where the mist that contains sulfuric acid coalesces. The coalesced mist is returned to the first scrubber 110 and the desulfurized flue gas flows to the oxidation tower 126.

The oxidation tower 126 utilizes gaseous chlorine dioxide ($ClO_2$) to oxidize elemental metals and any NO contained in the gas stream from the first scrubber 110. The oxidation tower 126 receives gaseous $ClO_2$ from chlorine dioxide feed system 128. Chlorine dioxide feed system 128, which produces gaseous chlorine dioxide that may be diluted with air or nitrogen to maintain the gaseous concentration below 10 percent, is described below.

The gaseous chlorine dioxide fed to oxidation tower 126 oxidizes NO and Hg or other heavy metals. This oxidation of NO and Hg may occur according to one or more of the following reactions:

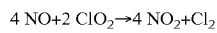

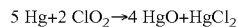

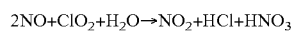

The HCl, $HNO_3$, $Cl_2$, HgO, $HgCl_2$, and $NO_2$ may be removed from the flue gas by subsequent scrubbing in second scrubber 130. The $NO_2$ may be captured as nitric acid in acidic hydrogen peroxide scrubber liquor generally as follows:

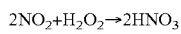

The oxidized mercury is generally converted to mercuric nitrate as it comes into contact with the nitric acid formed in the second scrubber 130. Since mercuric nitrate is water soluble, it will remain in solution in the scrubber liquor of the second scrubber 130. However, upon subsequent neutralization of the nitric acid in acid neutralization 142, the mercuric nitrate would be expected to convert to mercuric oxide, causing its precipitation and allowing for removal as sludge.

The concentration of hydrogen peroxide in the second scrubbing mixture ranges from 0.1 to 5 percent by volume and is controlled by a second hydrogen peroxide controller determining make-up hydrogen peroxide from the hydrogen peroxide storage 112 to add to the re-circulating scrubber liquor by first pump 132. The cleaned flue gas that exits from second scrubber 130 may pass through second demister 144 where nitric acid mist coalesces and is returned to second scrubber 130. The cleaned flue gas that may contain small amounts of nitric acid may optionally pass to third scrubber 154 (at reference letter B) where any trace amounts may be neutralized. Any suitable base may be used. For one embodiment, the neutralizer liquor 150 includes an aqueous solution of sodium hydroxide and sodium sulfite. For a further embodiment, neutralizer liquor 150 contains approximately 5 percent sodium hydroxide and 11.6 percent of sodium sulfite. Neutralizer liquor 150 is circulated by second pump 148 to third scrubber 154. The cleaned and neutralized flue gas passes to final wash chamber 156 where third pump 160 circulates a final wash solution 158, such as water, to remove any salts that were carried with the mist. The exiting cleaned flue gas passes through third demister 152 to reduce water misting. The demisted flue gas passes through heat exchanger 138 where the temperature is raised to a temperature above the dew point before it passes into flue gas stack 162. Alternately, an exhaust fan could be used in place of the heat exchanger at the outlet of the third demister 152, if desired, to boost the clean and neutralized flue gas out of the exhaust stack 162 as processed flue gas 164. The nitric acid stream from the second scrubber 130, including heavy metals, nitric acid, and hydrochloric acid is then sent to acid neutralization 142 for recovery or disposal.

Although chlorine dioxide is recognized as an unstable gas, the various embodiments generate the chlorine dioxide gas at the time of use and, optionally, provide for concurrent dilution with air. Chlorine dioxide may be produced continuously by mixing a solution of hydrogen peroxide ($H_2O_2$) and sulfuric acid ($H_2SO_4$) with the solution of sodium chlorate ($NaClO_3$). The produced chlorine dioxide may be mixed, as it is formed, with air to keep the gas phase concentration below 10 percent.

Figure 2:
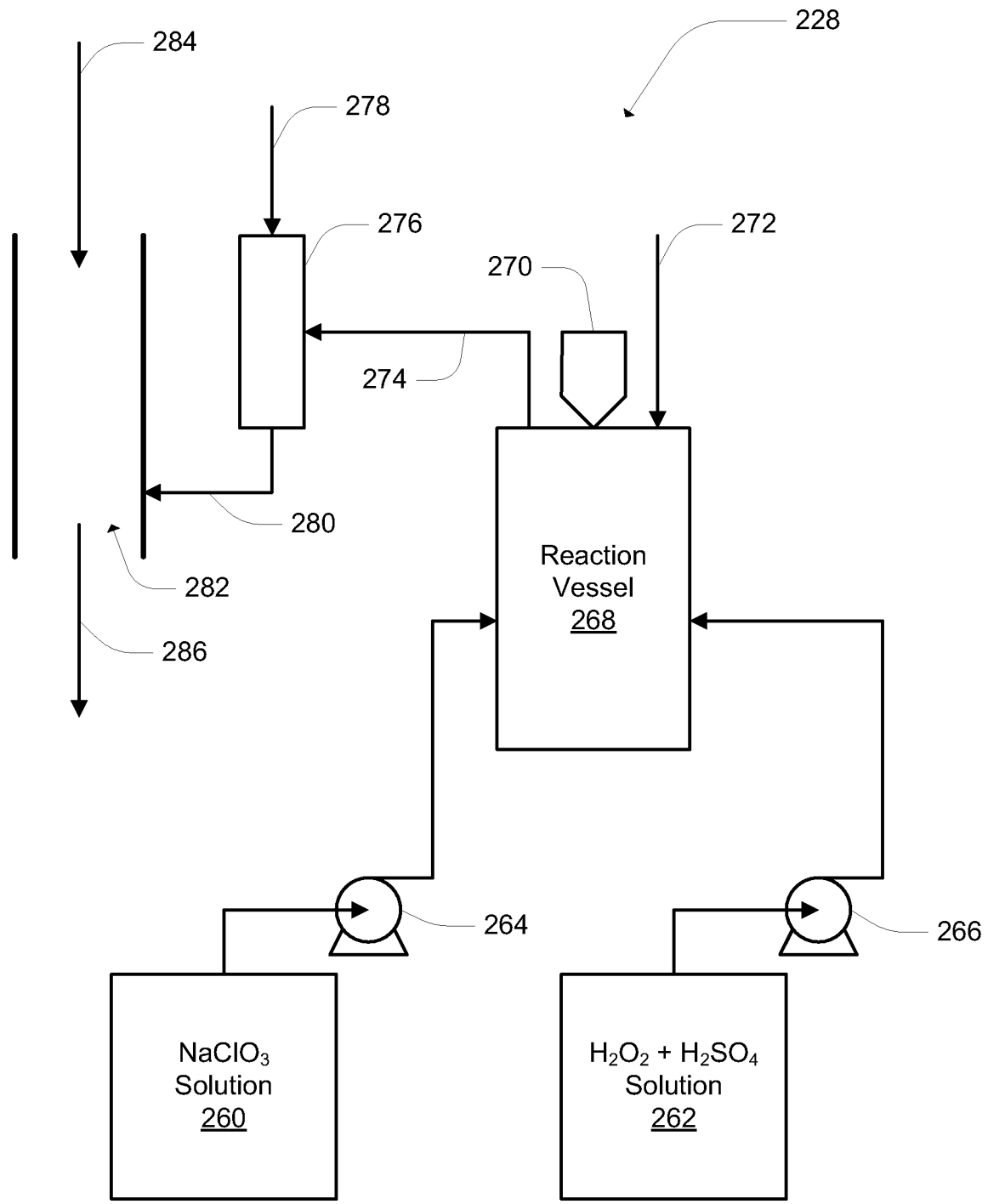
FIG. 2 is a functional schematic of a gaseous chlorine dioxide generation and injection system in accordance with an embodiment of the invention.

FIG. 2 is a functional schematic of a chlorine dioxide feed system 228 for use with embodiments of the invention. The gaseous chlorine dioxide is generated through a reaction of a sodium chlorate solution 260 and a hydrogen peroxide and sulfuric acid solution 262. The sodium chlorate solution is metered into a reaction vessel 268 using a metering pump 264. The hydrogen peroxide and sulfuric acid solution 262 is metered into the reaction vessel 268 using a metering pump 266.

For one embodiment, the hydrogen peroxide and sulfuric acid solution 262 is produced at 37.6 wt % of sulfuric acid and 3.5 wt % of hydrogen peroxide in water. The solution can be prepared by slowly adding a concentrated sulfuric acid solution to water, allowing that to cool, and then adding a concentrated hydrogen peroxide solution. For a further embodiment, the sodium chlorate solution 260 contains 50 wt % sodium chlorate (NaClO$_3$) in water. A solution having a specific gravity of 1.4 may be prepared by mixing equal weights of NaClO$_3$ and water. The solution can be prepared by slowing adding sodium chlorate to water and stirring until the solids are dissolved.

The reaction vessel 268 is preferably of a material resistant to the oxidizing power of the reagents, e.g., glass-lined, polyethylene-lined, Teflon®-lined, etc., and equipped with a mixer 270. To initiate the reaction, it may be desirable to add crystalline sodium chlorate to some hydrogen peroxide and sulfuric acid solution 262 in the reaction vessel 268, and then meter in further hydrogen peroxide and sulfuric acid solution 262 and sodium chlorate solution 260 after the reaction has begun, e.g., after approximately a 5-minute delay. By metering in at approximately stoichiometric molar quantities of the reagents 260 and 262, a desired production rate of chlorine dioxide may be maintained.

For one embodiment, desired rate for production of gaseous chlorine dioxide is an amount sufficient to reduce NO emissions from a flue gas stream 284 to a desired level when mixed with the flue gas 284 as described below. The reaction of the reagent solutions 260 and 262 may proceed generally as follows:

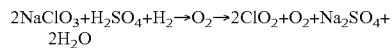

$$2NaClO_3 + H_2SO_4 + H_2 \rightarrow O_2 \rightarrow 2ClO_2 + O_2 + Na_2SO_4 + 2H_2O$$

Due to dilution as the reaction proceeds, the reaction vessel 268 may need to be drained occasionally for the removal of excess water and sodium sulfate (Na$_2$SO$_4$).

The reaction vessel may further include an air intake 272 to maintain the reaction vessel 268 at approximately ambient pressures and to provide an air sweep for dilution of the produced gaseous chlorine dioxide. For one embodiment the air intake 272 is passive and provides make-up air as a gaseous chlorine dioxide/air mixture 274 is pulled from head space of the reaction vessel 268 by an eductor 276. Alternatively, the air intake 272 may include regulated pressure feed to push the gaseous chlorine dioxide/air mixture 274 out of the reaction vessel 268. If air intake 274 is not passive, the eductor 276 may be eliminated. Note that while air is used in this example, an inert gas may also be substituted.

The eductor 276 is operated using a pressurized air feed 278, resulting in a further diluted gaseous chlorine dioxide/air mixture 280 for feed into flue 282. Note that the flue may represent the oxidation tower 126 of FIG. 1A. In this example, the incoming flue gas 284 would represent the output of the demister 124 of FIG. 1A, and the outgoing flue gas 286 would represent the output of the oxidation tower 126 fed to second scrubber 130.

The particulate material in the scrubber liquors includes insoluble sulfates that include mercury and/or other heavy metals. These solid materials are removed from the scrubber sump with a solids removal system, such as a continuous filter, centrifuge, or a combination of a continuous filter and a centrifuge. To further improve the separation efficiency, the scrubber sump can be divided into two compartments. The first compartment is designed to receive the scrubber liquor that is returning from the first scrubber tower and the second compartment is designed to receive the cleaned scrubber liquor and the overflow from the first compartment. The scrubber pump draws the scrubber liquor from the middle of the second compartment and the continuous filter or centrifuge draws from the bottom of the first compartment. This two-compartment configuration can facilitate maximizing the concentration of particulates going to the filter or centrifuge and minimizing the particulates going to the scrubber pump.

CONCLUSION

Methods and apparatus for controlling emissions have been described. The various embodiments provide for treating a gas stream including the removal of heavy metals, such as elemental mercury, from the gas phase. Some methods include washing a gas stream with water, scrubbing the gas stream with an acidic hydrogen peroxide solution to reduce SOx compounds, oxidizing the gas stream with gaseous chlorine dioxide to oxidize NO and elemental heavy metals, and scrubbing the oxidized gas stream with an acidic hydrogen peroxide solution to remove NO$_2$ and heavy metal compounds.

By utilizing methods and apparatus in accordance with the invention, combustion flue gas streams can be treated for the removal of NOx, SOx, and heavy metals, while isolating useful by-products streams of nitric acid, sulfuric acid, salts of nitric acid, salts of sulfuric acid and solids for the recovery of the heavy metals. One of the significant advantages of the present invention is the fact that the process can be run continuously, with measuring and adjustments made in real time while the process is being performed. Computer monitoring can initiate flow changes of reagents in response to automatic measurements to maintain desired process conditions.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of treating a combustion gas stream including at least sulfur oxides, nitric oxide, and heavy metal selected from the group consisting of heavy metal oxides, heavy metal hydroxides, and elemental heavy metal, comprising:
    a) scrubbing the gas stream in a first scrubber tower including:
        i) reacting sulfur oxides with a first hydrogen peroxide solution to convert the sulfur oxides to sulfuric acid, thereby producing a first scrubber liquor;
        ii) recycling at least a portion of the first scrubber liquor with the first hydrogen peroxide solution, thereby producing a scrubbing mixture for further scrubbing the gas stream;
        iii) measuring a hydrogen peroxide concentration in the first scrubber liquor;
        iv) maintaining a desired hydrogen peroxide concentration in the first scrubbing mixture by regulating a flow of the first hydrogen peroxide solution in response to the measured hydrogen peroxide concentration of the first scrubber liquor;
        v) converting at least a portion of any heavy metal oxides or heavy metal hydroxides in said gas stream to metal sulfates by contact with the sulfuric acid generated in said first scrubber tower;
        vi) removing a first by-product stream containing sulfuric acid and metal sulfates from said first scrubber tower after attaining a desired sulfuric acid concentration in the first scrubber liquor;
    b) after scrubbing the gas stream with the first hydrogen peroxide solution, oxidizing the nitric oxide and at least a portion of the elemental heavy metal in the gas stream in an oxidation tower including:
i) contacting the gas stream with gaseous chlorine dioxide in the oxidation tower to oxidize the elemental heavy metals to metal oxide and oxidize nitric oxide to nitrogen dioxide;
c) after oxidizing the gas stream with the gaseous chlorine dioxide, scrubbing the gas stream with a second hydrogen peroxide solution in a second scrubber including:
i) reacting the gas stream with the second hydrogen peroxide solution to convert nitrogen dioxide to nitric acid and convert metal oxides to nitrates of heavy metal upon contact with the nitric acid, thereby producing a second scrubber liquor;
ii) maintaining a desired hydrogen peroxide concentration in the second scrubber liquor by regulating a flow of the second hydrogen peroxide solution; and
iii) removing a second by-product stream containing nitric acid and nitrates of heavy metal from said second scrubber.

2. The method of claim 1, wherein said oxidizing step b) is further comprising:
generating gaseous chlorine dioxide in a continuous reaction process comprising continuously adding a sodium chlorate solution and a hydrogen peroxide and sulfuric acid solution to a reaction vessel.

3. The method of claim 2, wherein contacting the gas stream with the gaseous chlorine dioxide comprises removing the gaseous chlorine dioxide from the reaction vessel using an eductor.

4. The method of claim 3, further comprising: passively adding make-up air to the reaction vessel to maintain the reaction vessel at ambient conditions.

5. The method of claim 2, wherein contacting the gas stream with the gaseous chlorine dioxide comprises pressuring the gaseous chlorine dioxide from the reaction vessel into the gas stream using a pressurized air feed.

6. The method of claim 2, further comprising:
adjusting a rate of addition of the sodium chlorate solution and a rate of addition of the hydrogen peroxide and sulfuric acid solution to regulate the generation rate of the gaseous chlorine dioxide.

7. The method of claim 1, further comprising:
sampling a mixture of the first hydrogen peroxide solution and the recycled first scrubber liquor for a level of hydrogen peroxide; and
controlling the level of hydrogen peroxide in the mixture to be at least a predetermined level.

8. A method of treating a combustion gas stream containing at least sulfur oxides, nitric oxide, and mercury selected from the group consisting of mercury oxides, mercury hydroxides, and elemental mercury, the method comprising:
a) scrubbing the gas stream in a first scrubber tower including:
i) reacting sulfur oxides with a first hydrogen peroxide solution to convert sulfur oxides to sulfuric acid, thereby producing a first scrubber liquor;
ii) recycling at least a portion of the first scrubber liquor with the first hydrogen peroxide solution, thereby producing a scrubbing mixture for further scrubbing the gas stream;
iii) measuring a hydrogen peroxide concentration in the first scrubber liquor;
iv) maintaining a desired hydrogen peroxide concentration in the scrubbing mixture by regulating a flow of the first hydrogen peroxide solution in response to the measured hydrogen peroxide concentration of the first scrubber liquor;
v) converting at least a portion of any mercury oxides or mercury hydroxides to mercury sulfates by contact with the sulfuric acid generated in said first scrubber tower;
vi) removing a first by-product stream containing sulfuric acid and mercury sulfates from said first scrubber tower after attaining a desired sulfuric acid concentration in the first scrubber liquor;
b) after scrubbing the gas stream with the first hydrogen peroxide solution, oxidizing the nitric oxide and at least a portion of the elemental mercury in the gas stream in an oxidation tower including:
i) contacting the gas stream with a gaseous chlorine dioxide mixture in the oxidation tower to oxidize the elemental mercury to mercury oxide and oxidize nitric oxide to nitrogen dioxide;
c) after oxidizing the gas stream, scrubbing the gas stream with a second hydrogen peroxide solution in a second scrubber tower including:
i) reacting the gas stream with the second hydrogen peroxide solution to convert nitrogen dioxide to nitric acid and convert mercury oxide to nitrates of mercury upon contact with the nitric acid, thereby producing a second scrubber liquor; and
ii) removing a second by-product stream containing nitric acid and nitrates of mercury from the second scrubber liquor.

9. The method of claim 8, further comprising:
sampling a mixture of the first hydrogen peroxide solution and the recycled first scrubber liquor for a level of hydrogen peroxide; and
controlling the level of hydrogen peroxide in the mixture to be at least a predetermined level.

10. The method of claim 8, wherein removing solids comprises centrifuging the first scrubber liquor.

11. The method of claim 8, wherein scrubbing the gas stream with the second hydrogen peroxide solution further comprises:
feeding the gas stream into a scrubber;
feeding the second hydrogen peroxide solution into the scrubber;
removing solids from the second scrubber liquor; and
recycling the second scrubber liquor into the scrubber with the second hydrogen peroxide solution.

12. The method of claim 11, further comprising:
sampling the second scrubber liquor for a level of hydrogen peroxide; and
controlling the level of hydrogen peroxide in a mixture of the second hydrogen peroxide solution and the recycled second scrubber liquor to be at least a predetermined level.

13. The method of claim 8, wherein the gaseous chlorine dioxide mixture is generated in a continuous reaction process concurrently with oxidizing the gas stream using the chlorine dioxide mixture.

14. The method of claim 13, wherein the gaseous chlorine dioxide mixture is further generated in a process comprising continuously adding a sodium chlorate solution and a hydrogen peroxide and sulfuric acid solution to a reaction vessel.

15. The method of claim 14, wherein oxidizing the gas stream using the gaseous chlorine dioxide mixture comprises educting the chlorine dioxide mixture from the reaction vessel into the gas stream.

16. The method of claim 15, further comprising:
passively adding make-up air to the reaction vessel to maintain the reaction vessel at ambient conditions while educting the gaseous chlorine dioxide mixture from the reaction vessel.

17. The method of claim 14, wherein oxidizing the gas stream using the gaseous chlorine dioxide mixture comprises pressuring the chlorine dioxide from the reaction vessel into the gas stream.

18. The method of claim 14, further comprising: adjusting a rate of addition of the sodium chlorate solution and a rate of addition of the hydrogen peroxide and sulfuric acid solution to regulate a generation rate of gaseous chlorine dioxide.

19. The method of claim 1, wherein step b) is further comprising:
generating the gaseous chlorine dioxide; and
diluting the gaseous chlorine dioxide with air or inert gas concurrent with generating the gaseous chlorine dioxide and before contacting the gas stream with the gaseous chlorine dioxide.

20. The method of claim 19, wherein diluting the gaseous chlorine dioxide comprises diluting the gaseous chlorine dioxide to a gas phase concentration of less than 10 percent chlorine dioxide.

21. The method of claim 3, wherein removing the gaseous chlorine dioxide from the reaction vessel using an eductor comprises removing the chlorine dioxide from the reaction vessel using an eductor while adding air or inert gas to the reaction vessel to maintain a gas phase concentration of less than 10 percent chlorine dioxide.

22. The method of claim 8, wherein step b) is further comprising:
generating chlorine dioxide; and
diluting the chlorine dioxide with air or inert gas concurrent with generating the chlorine dioxide, thereby generating the gaseous chlorine dioxide mixture.

23. The method of claim 22, wherein diluting the chlorine dioxide comprises diluting the chlorine dioxide to a gas phase concentration of less than 10 percent chlorine dioxide in the gaseous chlorine dioxide mixture.

24. The method of claim 1 further comprising:
d) neutralizing a cleansed gas that exits the second scrubber by adding base to any residual acid gases forming a salt.

25. The method of claim 8, further comprising:
d) neutralizing a cleansed gas that exits said second scrubber tower by adding base to any residual acid gases forming a salt.

26. The method of claim 1 further comprising:
prior to scrubbing in step a), subjecting said gas stream to a cooling and wash chamber to cool and remove some of the particulates in the gas stream.

27. The method of claim 8 further comprising
prior to scrubbing in step a), subjecting said gas stream to a cooling and wash chamber to cool and remove some of the particulates in the gas stream.

* * * * *